United States Patent [19]
Moore

[11] Patent Number: 4,819,914
[45] Date of Patent: Apr. 11, 1989

[54] ELECTRICAL FENCE FOR LIVESTOCK

[75] Inventor: Richard A. Moore, Glen Ellyn, Ill.

[73] Assignee: All Line, Inc., Naperville, Ill.

[21] Appl. No.: 6,253

[22] Filed: Jan. 12, 1987

Related U.S. Application Data

[63] Continuation of Ser. No. 752,032, Jul. 5, 1985, abandoned.

[51] Int. Cl.⁴ .......................... A01K 3/00; H01B 5/08
[52] U.S. Cl. ...................................... 256/10; 256/45;
   174/124 R; 174/126.2; 174/128.1; 57/230;
   57/244
[58] Field of Search ..................... 256/10, 4, 23, 45;
   174/119 R, 124 R, 124 G, 128 R, 130, 126 CP,
   102 E; 340/564; 87/6; 57/212, 230, 231, 243,
   244

[56] References Cited

U.S. PATENT DOCUMENTS

| | | | |
|---|---|---|---|
| 424,575 | 4/1890 | Reed | 174/124 G |
| 1,950,126 | 3/1934 | Staples | 57/230 X |
| 1,999,273 | 4/1935 | Austin | 174/128 R |
| 2,390,039 | 11/1945 | Slayter et al. | 174/124 R |
| 3,223,796 | 12/1965 | Willoughby | 256/10 |
| 3,260,792 | 7/1966 | Kreisel | 174/130 |
| 3,291,897 | 12/1966 | Bramley | 256/10 |
| 3,366,854 | 1/1968 | Robinson | 256/10 |
| 3,504,892 | 4/1970 | Crist | 256/10 |
| 3,644,866 | 2/1972 | Deardurff | 174/130 R X |
| 3,655,994 | 4/1972 | Malme | 256/10 |
| 3,805,667 | 4/1974 | Orser | 174/124 R X |
| 3,868,545 | 2/1975 | Caron | 256/10 |
| 3,980,277 | 9/1977 | Enoksson | 256/10 |
| 4,494,733 | 1/1985 | Olsson | 256/10 |
| 4,728,080 | 3/1988 | Kurschner et al. | 256/10 |

FOREIGN PATENT DOCUMENTS 1176885 10/1984 Canada .................................. 256/10

Primary Examiner—Andrew V. Kundrat
Assistant Examiner—Peter M. Cuomo
Attorney, Agent, or Firm—Marshall, O'Toole, Gerstein, Murray & Bicknell

[57] ABSTRACT

An electrical conducting rope for use on electric fencing of livestock with an inner core of stranded conductor cable and an outer insulating layer of braided synthetic fiber filaments. The inner core is formed of seven cable strands, each formed of seven twisted galvanized wires. The outer layer is formed of a braid of multiple polyester filament carriers. The carriers have contrasting colors to provide high visibility of the electric fence. A standard electric fence charger connected to the inner conductor core provides electric shocks to livestock contacting the outer insulating layer. The outer layer may have gaps in the braiding to expose the inner conducting core below the surface of the outer layer.

10 Claims, 1 Drawing Sheet

ELECTRICAL FENCE FOR LIVESTOCK

This application is a continuation of application Ser. No. 752,032, filed July 5, 1985, now abandoned.

This invention relates to electrical fencing and in particular to an electrical conducting rope for use on electric fencing of livestock.

BACKGROUND OF THE INVENTION

Electric fencing composed of an electrical conductor is commonly used to form a barrier or fence for containing livestock such as horses and cattle. As is known, such electric fencing provides a slight electric shock to the livestock when they come in contact with the conductor.

Reference may be made to the following U.S. patents of interest describing such fencing conductors and power sources for supplying electrical impulses to the fence: U.S. Pat. Nos. 3,291,897; 4,155,083; 2,348,234; 2,316,211; 2,333,224; 2,375,458;:2,415,943; 2,981,854; 3,110,891; 3,230,518; 3,655,994; 3,655,995; 3,747,897; 3,772,529; 4,220,949.

Several problems have been encountered in the conductive wires used for currently available electric fencing material. In particular, prior fence conductors when broken between mounting posts tend to recoil. This forms a potentially dangerous condition for valuable livestock such as horses or cattle which entangle their legs in the coils of broken fence conductors and cannot easily extricate themselves from this entrapment. Often, the entangled livestock become so mutilated that they must be destroyed. Another major problem is the low visibility of currently available electric fencing which has become a serious hazard to persons operating snowmobiles, dirt bikes, etc. While painting of the wire with high visibility paint has been proposed to alleviate this hazard, this leads to a significant increase in the maintenance time and expense in maintaining any such high visibility paint on long runs of fencing wire which is continuously exposed to the environment.

A further continuing problem is that the conductive wire often contacts vegetation such as weeds along the fence path. Such contact is undesired since it short circuits the electrical charge on the conductive wire, particularly in wet conditions. Such undesired short circuiting reduces the effectiveness of the electric fence. Attempts have been made in the past to solve this weed problem by modifying the electrical power supply, such as described in the aforementioned U.S. Pat. Nos. 2,316,211; 2,333,224; and 2,375,458.

Thus, it is highly desirable to provide an electrically conducting material for use as an electric fence for containing livestock which provides high visibility as a safety factor for humans, which doesn't kink or coil when broken so as to protect livestock, and which reduces the tendency to short circuit on contacting vegetation such as weeds. In addition, it is desired that such electric fencing be of high tensile strength, lightweight, easy to work with and install, provide a neat appearance with a minimum of maintenance required, and be able to work with standard electric fence charging apparatus.

SUMMARY OF THE INVENTION

In accordance with the principles of the present invention, there is provided an electrical conducting rope for use on electric fencing which is of high visibility, does not kink or coil, reduces vegetation short out, exhibits high tensile strength and meets all of the above-described characteristics for such an electric fence.

An electrical conducting rope in accordance with the principles of the present invention includes an inner core of stranded conductor cable and an insulating outer layer of synthetic fiber filaments, preferably braided, surrounding and insulating the conductor cable from the environment. Each of the braided filaments is formed of multiple filament carriers, with each carrier comprising a plurality of twisted synthetic fiber filaments. At least one of the carriers is composed of fiber filaments of a color contrasting distinctively with the color of the other carriers. In the preferred embodiment, one of the carriers in the braided pattern is composed of black filaments while the other carriers is composed of bright white filaments.

The inner core of stranded conductor cable provides a lightweight, high tensile strength characteristic while preventing kinking or recoiling of the rope if cut or broken between supports. The insulating outer layer of braided multiple filament carriers of contrasting colors provides high visibility and reduces the tendency of vegetation short circuiting. The insulating outer layer also provides a neat appearance while protecting the inner conductor cable from the environment to significantly lessen any maintenance requirements.

In a preferred embodiment of the invention, electrically conducting rope is provided with an inner core of stranded conductor cable formed with seven strands, each strand formed of seven galvanized wires. Thus, the inner core is a 7×7 galvanized cable with a diameter of about 3/32 inch. The outer insulating layer in the preferred embodiment is formed of braided polyester filaments formed of multiple filament carriers, with each carrier comprising 1000 denier/192 filaments of polyester yarn per carrier. Eight carriers have been constructed in a diamond braid pattern with sixteen ends of 1000 denier/192 filaments of polyester yarn per carrier. As an alternative, twelve carriers are used in a solid braid pattern with twelve ends of 1000 denier/192 filaments of polyester yarn per carrier. The overall diameter of the completed electrical conducting rope in accordance with the present invention is about 7/32 inch.

In certain instances, such as very long fence runs, it is preferred that the insulating outer layer be formed with gaps so that the inner conductor cable is exposed below the surface of the outer layer. Such gaps may be provided by pretwisting the carrier yarn sufficiently so it bunches up and then forming a braided pattern around the inner cable to expose the cable below the outer layer surface.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like element in the several figures and in which:

DETAILED DESCRIPTION

Figure 1:
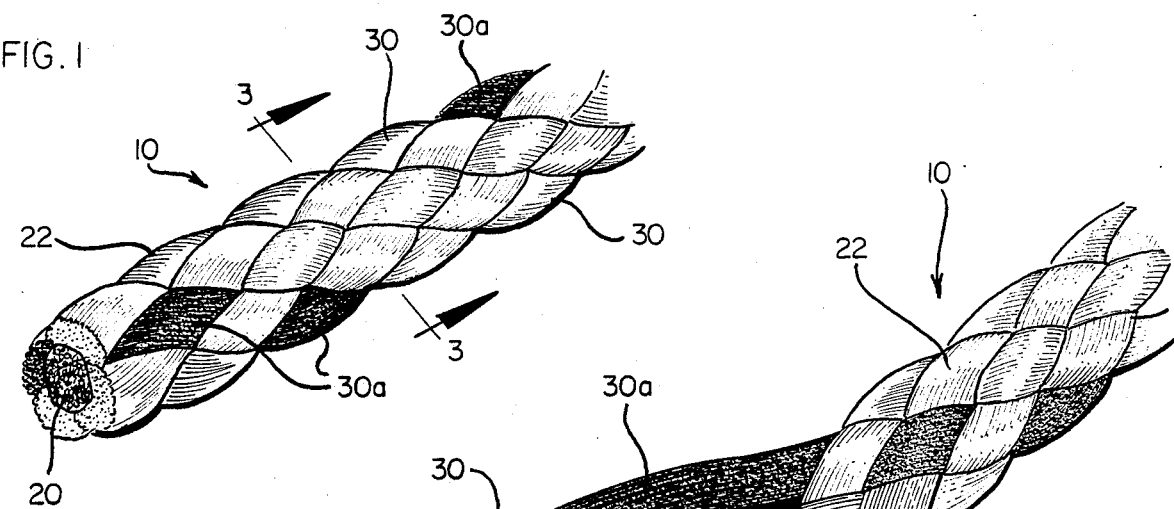
FIG. 1 is a perspective view illustrating a short length of an electrical conducting rope for use on electric fencing of livestock in accordance with the principles of the present invention.

Referring now to the drawings, there is illustrated an electrical conducting rope 10 mounted on support posts 12 with mounting members 14 so as to form an electric fence for containing livestock. Rope 10 is connected through wire 16 to a standard electric fence charger 18. Thus, any livestock contacting rope 10 will be subjected to an electric shock so that the livestock will be maintained in the area bordered by the fence.

Figure 2:
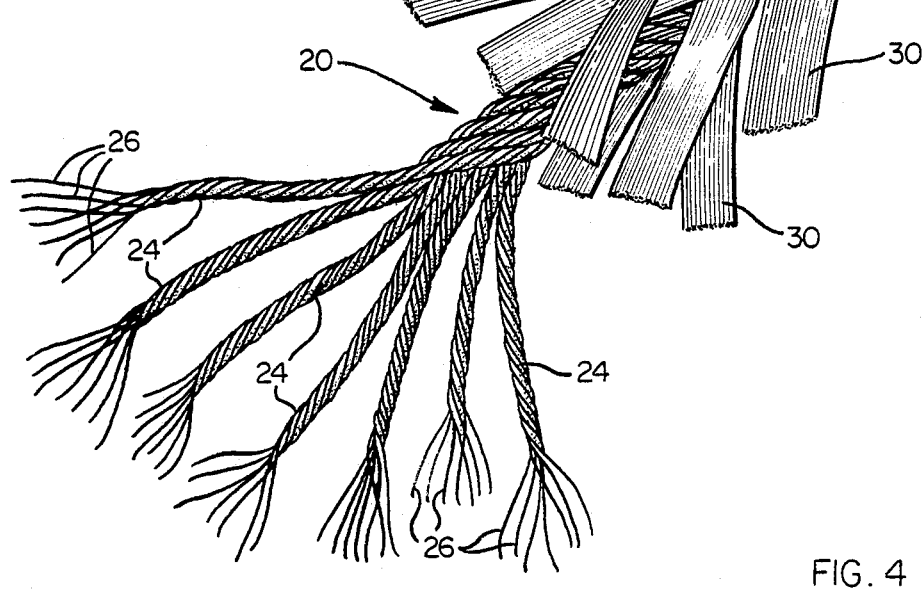
FIG. 2 is a perspective view of the electrical conducting rope of FIG. 1 and illustrating the inner core of stranded conductor cable and the insulating outer layer of braided synthetic fiber filaments.
Figure 3:
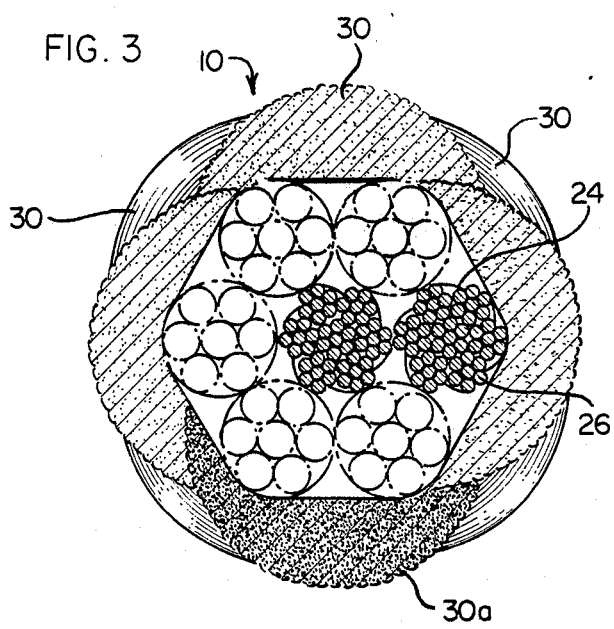
FIG. 3 is a sectional view taken along section lines 3—3 of FIG. 1.

FIGS. 1-3 illustrate the characteristics of electrical rope 10 in more detail which provide the desired high visibility, non-kinking or coiling, high tensile strength, and the reduced susceptibility to short circuiting on vegetation. Rope 10 includes an inner core 20 of stranded conductor cable and an insulating outer layer 22 of braided synthetic fiber filaments. Core 20 is formed of several strands 24 each in turn formed of a plurality of twisted conductor wires 26. In the preferred embodiment illustrated in more detail in FIGS. 2 and 3, it can be seen that there are seven strands 24 forming the inner core of stranded conductor cable. In addition, each strand 24 is made up of seven wires 26. In a constructed embodiment of the invention, a 7×7 galvanized cable, 3/32 inch diameter was utilized as inner core 20.

Insulating outer layer 22 is formed of braided synthetic fiber filaments surrounding and insulating inner core 20 from the environment. The braided outer layer illustrated in the drawings is a braided pattern known as a "diamond" pattern, although other types of braided patterns such as a "sash" pattern can be used as well. In the illustrated preferred embodiment, braided outer layer 22 is formed of multiple synthetic fiber filament carriers 30 with each carrier comprising a plurality of slightly twisted synthetic fiber filaments. In a constructed embodiment of the invention, eight carriers 30 were formed in a braided insulating outer layer with each carrier being formed of 1000 denier/192 filaments of polyester slightly twisted to about 0.5 turn per inch. As can be seen most clearly with reference to FIGS. 1 and 3, the outer layer completely surrounds inner core 20 of stranded conductor cable so as to completely electrically insulate the inner core and physically isolate the inner core from the environment. A completed electrical conducting rope as herein above described has a diameter of about 7/32 inch.

In accordance with an important aspect of the present invention, one of the filament carriers labeled 30a is composed of synthetic fiber filaments bearing a color which contrasts with the color of the fiber filaments in the remaining carriers 30. As an example, the synthetic fiber filaments of carrier 30a are all black in color whereas the filaments of the remaining carriers 30 are composed of contrasting bright white filaments. This enables rope 10, when installed on an electric fence system, to exhibit high visibility to livestock as well as to snowmobilers, dirt bikers, etc. It is understood, of course, that other colors or contrasting colors may be used to contrast with the prevailing color configuration of the environment. As an example, an all white or all storage filament/carrier configuration may be desired in some areas, whereas in other situations, contrasting filament/carriers of orange and white or blue and white may be desired.

As an example of the construction of an electrical conducting rope 10 of the present invention, currently available 7×7 galvanized 3/32 inch diameter cable was used as the inner core. Sixteen ends of 1000 denier/192 polyester filaments are used to form each carrier. Seven white carriers 30 and one black carrier 30a along with inner core 20 are set into a standard textile braiding machine forming a diamond pattern as illustrated in the drawings.

Thus, the electrically conducting rope of the present invention provides the following significant advantages over currently available electric fencing material:

1. High tensile strength provided by the inner core of stranded conductor cable;

2. High visibility and safety provided by the bright outer layer or contrasting colors on the outer layer;

3. Doesn't cut easily and even if cut, doesn't kink or coil so as to protect livestock and prevent them from becoming entangled—which feature is provided by the inner core of stranded conductor cable; and 4. Reduces the tendency to short circuit the fence on vegetation such as weeds or high grass due to the insulating outer layer.

Figure 4:
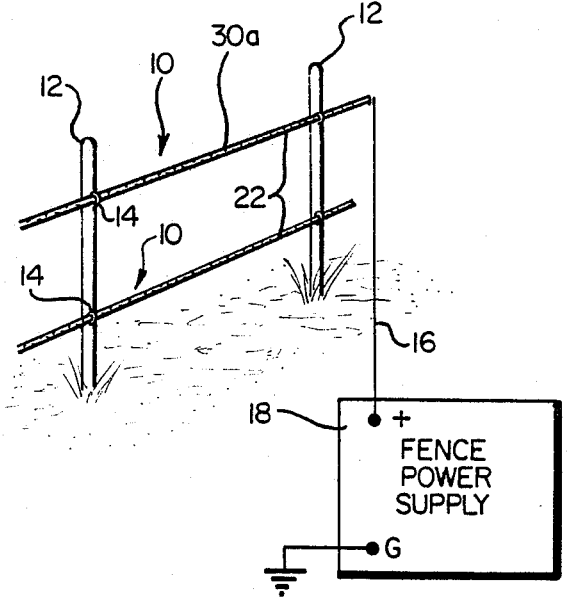
FIG. 4 is a schematic view illustrating an electric fence for livestock using the electrical conducting rope of FIG. 1 and a standard electric fence charger or fence power supply.

In addition, the electrical conducting rope of the present invention when utilized in electric fencing requires virtually no maintenance as no painting is required and the metal inner core is completely protected from the environment. Despite the outer insulating conductor, rope 10 when installed in an electric fence as shown in FIG. 4, with a standard fence power supply 18, provides an electric shock to livestock contacting the rope. Typical electric fence chargers 18 provide short, repetitive high voltage pulses of very low current. The high voltage pulses may typically be in the thousand volt range whereas the current is in the low milliampere range. Apparently, the high voltage pulses from the fence charger which are coupled on to inner conductive core 20 can "jump" or be coupled across insulating layer 22 and into an animal contacting the outer layer. The electrical circuit is completed through the animal contacting the ground and a return path is established through the earth to the grounded terminal of the electrical charger.

On very long runs of fencing using conducting rope 10, the shock affect on animals may diminish below an acceptable desired value. An alternative embodiment may be utilized in such instances, or even in other instances, where perhaps due to dry soil conditions or thick skinned animals the shock affect is diminished. In the alternative embodiment of the invention, periodic apertures or gaps may be provided in the insulating outer layer and along its length to expose the inner conducting core below the surface of the outer layer at each gap.

As an example of constructing such an alternative embodiment, inner core 20 and each carrier 30 can be formed as previously described except that each carrier may be pretwisted 2-3 turns per inch rather than 0.5 turn per inch. The pretwisting tends to bunch up the carriers so that when the braided pattern is formed on the inner core as previously described, periodic gaps in the braided outer layer will be provided along the rope length. The inner core will be exposed at each gap below the surface of the outer layer. Each aperture or gap in the braided pattern is small so the inner conductive core is substantially surrounded and protected from the environment by the insulating outer core and the animal does not contact the inner core even at the gaps.

The foregoing detailed description has been given for clearness of understanding only, and no unnecessary limitations should be understood therefrom, as modifications will be obvious to those skilled in the art.

I claim:

1. An electrical conducting fence rope for use on electrical fencing of livestock and supplying electric shocks to livestock contacting an outer surface of said fence rope comprising:

an inner core of stranded conductor cable, each strand formed of a plurality of twisted, galvanized wires; and an insulating outer layer of synthetic fiber filaments completely surrounding the conductor cable to physically isolate the conductor cable with said synthetic fiber filaments so that no conductive portion of the conductor cable is exposed and contactable by livestock on said outer surface of said fence rope, said outer insulating layer being formed of multiple filament carriers with each carrier comprising a plurality of twisted synthetic fiber filaments, said electrical conducting fence rope providing electric shocks to livestock contacting only the insulating outer layer of synthetic fiber filaments on said outer surface of said fence rope.

2. An electrical conducting rope according to claim 1, wherein said outer layer is formed of braided multiple filament carriers.

3. An electrical conducting rope according to claim 2, wherein at least one of said multiple filament carriers is composed of twisted synthetic fiber filaments of a color contrasting distinctively with respect to the color of the other of said carriers.

4. An electrical conducting rope according to claim 3, wherein said synthetic fiber filaments are formed of polyester.

5. An electrical conducting rope according to claim 4, wherein said polyester filaments are 1000 denier.

6. An electrical conducting rope according to claim 5, wherein each carrier is formed of 1000 denier/192 filaments of polyester.

7. An electrical conducting rope according to claim 1, wherein each strand of said inner core is formed of a plurality of twisted wires.

8. An electrical conducting fence rope for use on electric fencing of livestock in an environment and supplying electric shocks to livestock contacting an outer surface of said fence rope comprising:

an inner core of stranded conductor cable, each strand formed of a plurality of twisted galvanized wires;

an outer layer of electrical insulating synthetic fiber filaments completely surrounding and insulating the conductor cable to physically isolate the conductor cable from the environment so that no conductive portion of the conductor cable is exposed to the environment on said outer surface of said fence rope;

the outer layer of electrical insulating synthetic fiber filaments being formed of a braid of multiple filament carriers, each with about 1000 denier/192 filaments of polyester yard per carrier; and the carriers formed of contrasting colors to provide high visibility of the electric fence, said electrical conductive fence rope providing electric shocks to livestock contacting only the outer layer on the outer surface of said fence rope.

9. An electric fence rope for containing livestock in an environment and supplying electric shocks to livestock contacting an outer surface of said fence rope comprising:

an inner core of stranded conductor cable, each strand formed of a plurality of twisted galvanized wires;

an outer layer of electrical insulating synthetic fiber filaments forming the outer surface of said fence rope, said synthetic fiber filaments completely surrounding the inner core to physically isolate the inner core from the environment so that no conductive portion of the conductor cable is exposed to the environment on said outer surface of said fence rope, the outer layer of electrical insulating synthetic fiber filaments being formed of multiple filament carriers with each carrier comprising a plurality of twisted synthetic fiber filaments;

means for supporting the inner core and outer layer around a defined fenced boundary area; and an electric power supply connected to the inner core for supplying pulses of high voltage and low current to provide an electric shock to livestock contacting only the outer layer forming the outer surface of said fence rope and without contacting the inner core of conductor cable.

10. An electric fence according to claim 9, wherein the twisted synthetic filaments are formed in a braided pattern and with some of the filaments having a color contrasting with the color of the other filaments to enable the outer insulating layer to be highly visible thereby providing a safety warning to individuals of the defined fence boundary area.

* * * * *